United States Patent Office.

HENRY A. MARTIN, OF ROXBURY, ASSIGNOR TO JOSEPH H. ADAMS, OF BOSTON, MASSACHUSETTS.

*Letters Patent No. 73,109, dated January 7, 1868; antedated December 28, 1867.*

IMPROVED FIBROUS MATERIAL FOR THE MANUFACTURE OF ROPES, CORDS, AND FOR COVERING WIRES, CORDS, &c.

*The Schedule referred to in these Letters Patent and making part of the same.*

---

Be it known that I, HENRY A. MARTIN, of Roxbury, in the county of Norfolk, and State of Massachusetts, have invented or discovered a new and useful Fibrous Material to be Used in the Manufacture of Twine, Cord, Rope, or of any woven substance in which fibrous material may be employed; and I do hereby declare that the following is a full, clear, and exact description of my invention, whereby any one skilled in the art to which it appertains may be able to manufacture and use the same.

My invention or discovery relates to the well-known substance, gutta percha, which, in its natural or any prepared state, is supposed to be entirely anti-fibrous; and my invention consists in first rolling out gutta percha into a very thin sheet, of any desired length and convenient width, and then separating such sheet into fibres in the direction of its length. The gutta percha may be rolled into sheets by being passed between rollers of metal or other material, and when so rolled by my process, it will be found to be very strong and tenacious in the direction of its length, but possessing very little cohesion or tenacity in the direction of its width, so that it can be very easily separated into very fine fibres, of any desirable or convenient length, by any suitable process or means, which fibres may be used for making twine, cord, rope, or be woven together into a fabric either wholly or in part.

When made into twine or cord, it will be found very useful in its application as an insulator to telegraph-wires, when the same are laid under water, the wires being enveloped in a series of cords braided or twisted together, by which they are completely protected from the water. The great strength of the material, when thus used, will enable a cable of very small diameter to be laid and extend a considerable distance. When made into ropes, it may be used in places where exposure to moisture is liable to affect injuriously ropes of any ordinary material.

It may be separated into fibres as fine as silk, and employed like the latter in telegraphic or electric apparatus.

What I claim as new, and desire to secure by Letters Patent, is—

A fibre formed from gutta percha for the purposes set forth.

In testimony whereof, I have signed my name to this specification, in the presence of two subscribing witnesses.

HENRY A. MARTIN.

Witnesses:
  J. H. ADAMS,
  M. S. G. WILDE.